USO05117935A

United States Patent [19]

Hall

[11] Patent Number: 5,117,935
[45] Date of Patent: Jun. 2, 1992

[54] LOAD SENSING HYDROSTATIC STEERING SYSTEM

[75] Inventor: Lowell R. Hall, Elwood, Ill.

[73] Assignee: Caterpillar Inc., Peoria, Ill.

[21] Appl. No.: 632,222

[22] Filed: Dec. 21, 1990

[51] Int. Cl.[5] .......................................... B60K 17/358
[52] U.S. Cl. ...................................... 180/235; 180/139;
60/384; 60/446
[58] Field of Search ............... 180/235, 134, 139, 152, 180/155, 158; 60/446, 384, 445

[56] References Cited

U.S. PATENT DOCUMENTS

| 3,566,749 | 3/1971 | Allen et al. | 91/445 |
| 3,920,217 | 11/1975 | Olsen | 251/57 |
| 4,418,612 | 12/1983 | Nanda | 91/446 |
| 4,481,770 | 11/1984 | Lohbauer et al. | 60/445 |
| 4,553,389 | 11/1985 | Tischer et al. | 60/384 |
| 4,558,759 | 12/1985 | Baatrup et al. | 180/235 |

Primary Examiner—Charles A. Marmor
Assistant Examiner—Anne Marie Boehler
Attorney, Agent, or Firm—John W. Grant

[57] ABSTRACT

Neutralizer valves are useful in hydraulic steering systems to hydraulically stop the steering motion. However the known neutralizer valve arrangements will not work in load sensing hydrostatic steering systems. The subject load sensing hydrostatic steering system has a limit valve disposed in a load pressure signal signal line to normally communicate a load pressure siganl from a steering valve to a displacement controller of a load sensing variable displacement pump so that the displacement of the pump is regulated to meet the demand for pressurized fluid by the steering valve. When a pair of vehicle members reach a preselected position during a steering maneuver, the limit valve is moved to a position interrupting communication of the load pressure signal to the displacement controller causing the pump to destroke to its minimum output thereby stopping the flow of pressurized fluid to the steering valve and to a pair of steering cylinders. The limit valve remains in the actuated position only momentarily and then moves back to the communicating position to permit steering of the vehicle in the opposite direction substantially immediately after the vehicle members reach the predetermined position.

7 Claims, 1 Drawing Sheet

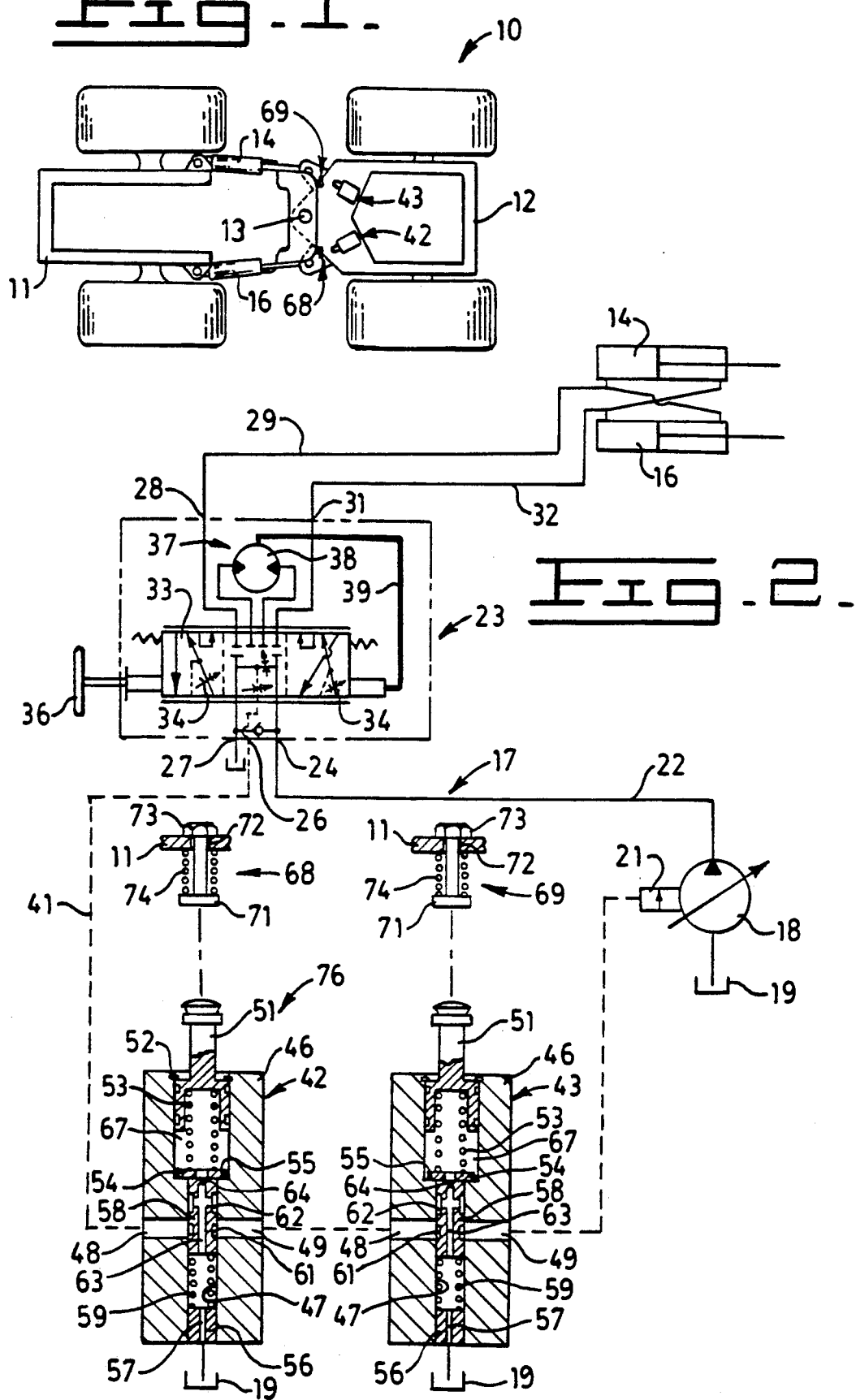

LOAD SENSING HYDROSTATIC STEERING SYSTEM

TECHNICAL FIELD

This invention relates to a powered steering system and more particularly to a load sensing hydrostatic steering system.

BACKGROUND ART

The steering system for many articulated vehicles have neutralizer or limit valves to shift a steering valve to a neutral or blocking position to hydraulically stop the steering movement prior to the mechanical stops attached to the frames of the vehicle making contact. Such a steering system usually includes a pilot operated steering valve to control the flow of pressurized fluid from a steering pump to the steering actuator with the steering valve being moved to a steering position by pilot fluid directed thereto through a pair of pilot lines which in many cases are connected to a hand metering unit (HMU). The neutralizer or limit valves of such systems are disposed in the pilot lines and are actuated to block the pilot flow from the steering valve when the frames reach a predetermined steering angle. The steering valve thus returns to a neutral or fluid blocking position to hydraulically lock the actuators to maintain the frames at the desired steering angle.

Some of the smaller articulated vehicles have a hydrostatic steering system in which the HMU directly controls the flow of pressurized steering fluid from the steering pump to the steering actuators without the use of a separate steering valve. The hydrostatic steering system of some of such vehicles are of the load sensing type in which the fluid supply is provided by a load sensing variable displacement pump which provides fluid to the HMU in the quantity and at the pressure demanded by the HMU. One of the problems encountered therewith is that since the hydrostatic steering systems do not have any pilot lines, the neutralizer arrangement noted above will not work therein. However, it is still desirable to hydraulically stop the steering movement of the frames before the engagement of the mechanical stops.

The present invention is directed to overcoming one or more of the problems as set forth above.

DISCLOSURE OF THE INVENTION

In one aspect of the present invention, a load sensing hydrostatic steering system for a vehicle having members which move relative to each other during steering maneuvers and a double-acting hydraulic cylinder connected to the vehicle members to effect steering of the vehicle. The system includes a load sensing variable displacement pump having a pressure responsive displacement controller, a fluid flow metering device connected to the hydraulic cylinder and the variable displacement pump and having a load sensing port and a load pressure signal line communicating the load sensing port with the displacement controller. A limit valve is disposed in the signal line and is movable between a first position at which a load pressure signal present at the load sensing port is communicated to the displacement controller and a second position interrupting the communication of the load pressure signal to the displacement controller. Means for momentarily moving the limit valve from the first position to the second position when the members reach a preselected position relative to each other is also included.

BRIEF DESCRIPTION OF THE DRAWINGS

FIG. 1 is a diagrammatic illustration of an articulated vehicle; and

FIG. 2 is a schematic illustration of an embodiment of the present invention.

BEST MODE OF CARRYING OUT THE INVENTION

An articulated vehicle is diagrammatically illustrated at 10 and has a pair of frame members 11, 12 pivotally connected at 13. The vehicle is steered by a pair of double-acting hydraulic steering cylinders 14, 16 conventionally connected to and positioned between the articulated frame members. Steering the vehicle to the right when the vehicle is traveling from left to right as viewed in FIG. 1 is accomplished by extending the steering cylinder 14 and retracting the steering cylinder 16 to pivot the frame members 11, 12 relative to each other about the pivot 13. Similarly, steering the vehicle to the left is accomplished by retracting the hydraulic cylinder 14 and extending the steering cylinder 16 to pivot the frame members 11, 12 about the pivot 13.

A load sensing steering system 17 provides pressurized fluid for operating the steering cylinders 14, 16. The steering system includes a load sensing variable displacement pump 18 connected to a tank 19 and having a pressure responsive displacement controller 21. A supply conduit 22 is connected to the pump 18 for delivering pressurized fluid therefrom to a fluid flow metering device 23. The fluid flow metering device in this embodiment is the type commonly referred to as a hand metering unit and includes a fluid inlet port 24 connected to the supply conduit 22, a load pressure signal port 26, a return port 27 connected to the tank 19, a right turn port 28 connected to the steering cylinders 14, 16 through a cylinder conduit 29 and a left turn port 31 connected to the steering cylinders through a cylinder conduit 32. The metering device further includes a valving arrangement illustrated in the drawing as a valve element 33 which is movable from a neutral position to either a right-turn position or a left-turn position. In either of the turn positions, the valve element 33 establishes a variable orifice 34 between the inlet port 24 and the respective right or left turn port. A steering wheel 36 is conventionally connected to the valve element 33 for moving the valve element to the turn positions. A means 37 is provided for directing a regulated volume of pressurized control fluid from the supply conduit 22 through the variable orifice 34 and into the respective cylinder conduit 29 or 32 when the valve element is moved to one of the turn positions. The means 37 can be, for example, a gerotor metering mechanism 3 connected to the valving arrangement 37 by means of a direct mechanical link 39. The load pressure signal port 26 senses the load pressure downstream of the variable orifice 34 when the valving element 33 is in one of its turn positions.

A load pressure signal line 41 connects the signal port 26 to the displacement controller 21 of the pump 18. A pair of limit valves 42, 43 are disposed in the signal line. Each of the limit valves includes a body 46 having a longitudinally extending stepped bore 47 therein and a pair of ports 48, 49 in communication with the stepped bore 47 and being connected to the signal line 41. A piston 51 is slidably disposed in the enlarged section of the stepped bore 47 and is retained therein by a retaining ring 52. A coil compression spring 53 is positioned between the piston 51 and an annular washer 54 seated on an annular shoulder 55 formed in the body. A fitting 56 is secured within the lower end of the stepped bore 47 by a threaded connection, for example, and has a passage 57 therein communicating the bore with the tank 19. A valve spool 58 is slidably disposed in the stepped bore 47 and is resiliently urged into abutment with the washer 54 by a compression spring 59 positioned between the fitting 56 and the valve spool. The valve spool has a pair of axially spaced annular grooves 61, 62 with the annular groove 61 normally being in communication with the ports 48, 49 when the valve spool is in the position shown. A passageway 63 is provided in the valve spool 58 and continuously communicates the annular groove 62 with the lower end of the stepped bore 47. An orifice 64 continuously communicates the passageway 63 with a chamber 67 formed in the enlarged section of the stepped bore between the piston 51 and the valve spool 58. Each of the valve spools is movable between a first position at which the annular groove 61 communicates the port 48 with the port 49 and a second position at which the passageway 63 communicates both of the ports 48, 49 with the tank 19 through the fitting 56.

The bodies 46 of the limit valves 42, 43 are suitably connected to the frame member 12 at a position in which the pistons 51 engage a stop means 68, 69 suitably connected to the frame member 11 when the frame members reach a preselected position relative to each other. Each of the stop means includes an engagement member 71 slidably extending through a hole 72 in the frame member 11 and retained therein by a nut 73. A compression spring 74 is positioned between the engagement member 71 and the frame member 11. The preloads on the springs 74 and 67 are selected so that a considerable greater force is required to compress the spring 74 than that required to compress the springs 67. Alternatively, the engagement members 71 can be adjustably secured to the frame members and the spring 74 omitted.

The stop means 68, 69, the piston 51 and the orifice 64 constitute a means 76 for momentarily moving a respective one of the limit valves 42, 43 from its first position to its second position when the frame members 11, 12 reach a preselected position relative to each other during a steering maneuver.

INDUSTRIAL APPLICABILITY

Prior to being put into operation but with the prime mover connected to the pump 18 operating, the signal port 26 is vented to the tank 19 through the return port 27 such that the displacement controller 21 maintains the displacement of the pump 18 at a setting to provide a minimum standby pressure in the supply conduit 22. To initiate a left turn, the operator rotates the steering wheel 36 in the appropriate direction to move the valve element 33 of the metering device 23 to the right to direct pressurized fluid from the inlet port 24 through the variable orifice 34, the gerotor metering mechanism 38 and into the cylinder conduit 32. The gerotor metering mechanism 38 functions to measure or regulate the amount or volume of steering fluid passing through the valve element 33 dependent upon the degree of rotation of the steering wheel 36. The fluid pressure generated downstream of the orifice 34 is directed through the load sensing port 26 and the signal line 41 to the displacement controller 21 which now functions to regulate the output of pump 18 to meet the flow and pressure requirements to satisfy the steering demands. The pressurized fluid in the cylinder conduit 32 causes extension of the steering cylinder 16 and retraction of the steering cylinder 14 to pivot the frames 11, 12 about the pivot 13 causing the limit valve 42 and stop means 68 to move toward each other. When the frames 11, 12 reach a preselected steering angle, the engagement member 71 of the stop means 68 engages the piston 51 of the valve means 42, thereby moving the piston toward the valve spool 58. The orifice 64 restricts fluid flow therethrough so that the movement of the piston 51 momentarily pressurizes the fluid in the chamber 67 sufficient to move the valve spool 58 to a position at which the annular groove 62 communicates with the ports 48, 49. This vents the load pressure signal in the signal line 41 and the displacement controller 21 through the passageway 63 and the passage 57 to the tank, thereby causing the displacement controller 21 to destroke the pump 18 back to its minimum displacement position. In so doing, the flow of pressurized fluid to the supply conduit 22 and thus through the cylinder conduit 32 essentially stops. The absence of pressurized fluid in the supply conduit 22 immediately greatly increases the operator effort required to turn the steering wheel 36. The fluid trapped in the chamber 67 is metered through the orifice 64 in a controlled manner due to the spring 59 forcing the spool 58 toward the washer 54 to its original position. The size of the orifice 64, the volume of the chamber 67 and the spring rate of the spring 59 are selected in this embodiment so that the spool 58 returns to its original position in approximately two-tenths of a second. Thus, the operator can steer the vehicle in the opposite direction substantially immediately with negligible delay.

When the vehicle is being steered to the right, the stop means 69 and limit valve 43 will react in a similar manner to stop movement of the frames at a preselected angle in the right steer position.

In view of the above, it is readily apparent that the present invention provides an improved load sensing hydrostatic steering system in which the steering motion is automatically stopped when the frame members reach a predetermined position relative to each other. This is accomplished by positioning a pair of limit valves in the load pressure signal line connected to the displacement controller in a series flow relationship so that when the frames reach the predetermined relationship, one of the limit valves is momentarily actuated. This effectively interrupts the communication of the load pressure signal to the displacement controller of the pump causing it to destroke the pump to stop the flow of steering fluid to the steering cylinders. The construction of the limit valve allows it to quickly return to a position for reestablishing communication through the signal line to permit steering of the vehicle in the opposite direction without any noticeable delay.

Other aspects, objects, and advantages of this invention can be obtained from a study of the drawings, the disclosure, and the appended claims.

I claim:

1. A load sensing hydrostatic steering system for a vehicle having members which move relative to each other during steering maneuvers and a double-acting hydraulic cylinder connected to the vehicle members to effect steering of the vehicle, comprising:

a load sensing variable displacement pump having a pressure responsive displacement controller;

a fluid flow metering device connected to the hydraulic cylinder and the variable displacement pump and having a load pressure signal port;

a load pressure signal line communicating the signal port with the displacement controller;

a limit valve disposed in the signal line and being movable between a first position at which a load pressure signal present at the signal port is communicated to the displacement controller and a second position interrupting the communication of the load pressure signal to the displacement controller; and means for momentarily moving the limit valve from the first position to the second position when the vehicle members reach a preselected position relative to each other.

2. The load sensing hydrostatic steering system of claim 1, wherein said limit valve includes a body mounted on one of the vehicle members and having a bore therein, a valve spool slidably disposed in the bore and movable therein to establish the first and second positions of the limit valve, and a spring biasing the valve spool to the first position.

3. The load sensing hydrostatic steering system of claim 2, wherein said moving means includes a piston slidably disposed in the bore of the valve body defining a fluid chamber between the piston and the valve spool, and stop means for moving the piston toward the spool when the vehicle members reach the predetermined position relative to each other so that fluid in the fluid chamber is pressurized and moves the valve spool to the second position against the bias of the spring.

4. The load sensing hydrostatic steering system of claim 3, wherein said moving means includes orifice means for venting the chamber so that the spring moves the valve spool back to its first position a preselected period of time after it has been moved to the second position.

5. The load sensing hydrostatic steering system of claim 4, wherein the orifice means includes an orifice in the valve spool.

6. The load sensing hydrostatic steering system of claim 5, wherein the valve body has a pair of ports opening into the bore and connected to the signal line, the valve spool has a pair of axially spaced annular grooves and a passageway communicating one of the annular grooves with the tank, said one annular groove being in communication with the ports when the valve spool is at the second position to vent the signal line to the tank and the other annular groove being in communication with the ports when the spool is at the first position.

7. The load sensing hydrostatic steering system of claim 6, including another limit valve disposed in the signal line in series flow relationship with the first mentioned limit valve and another means for moving the other limit valve from its first position to its second position when the vehicle members reach a second preselected position relative to each other.

* * * * *